Josef Pürrer
Martin Maier
Albert Krauss
Inventors.

By Karl F. Ross
Attorney

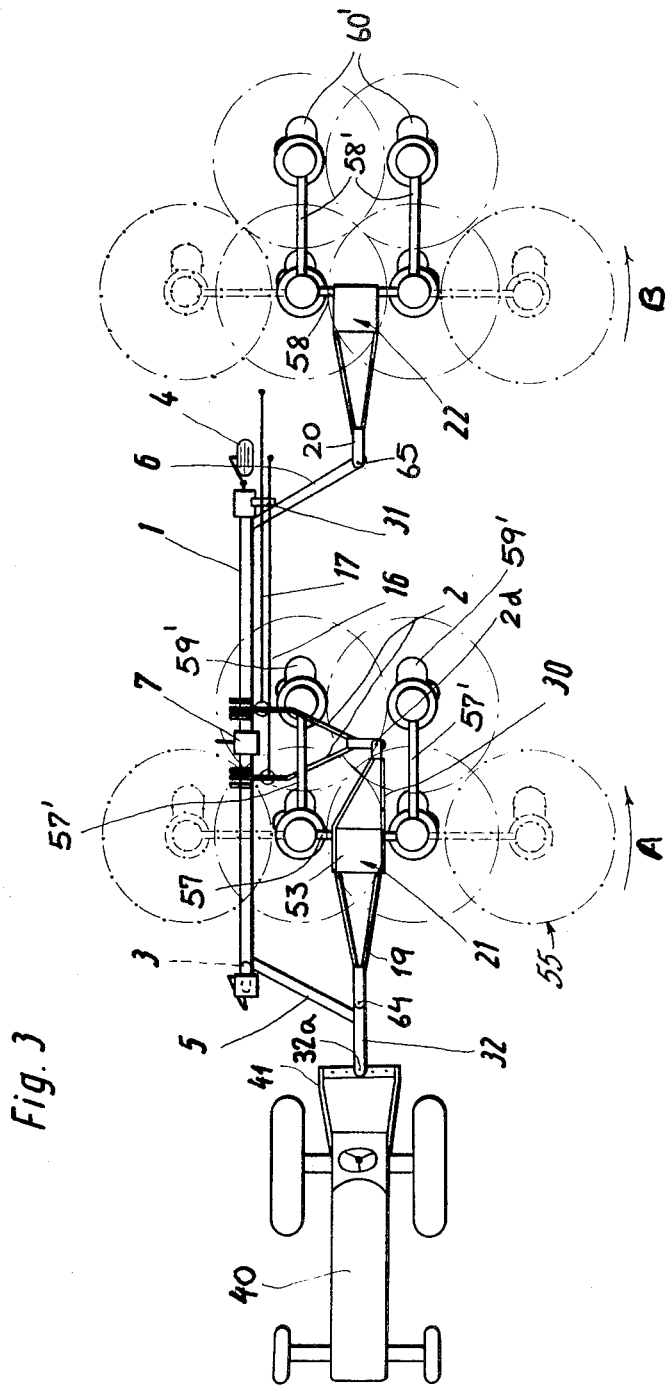

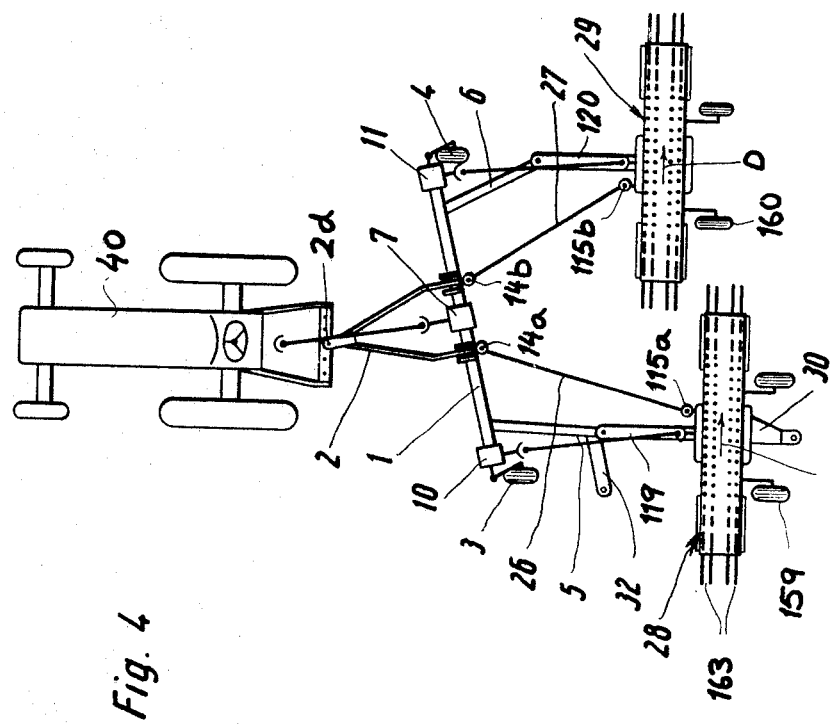

Aug. 4, 1970     J. PURRER ET AL     3,522,860
HITCH FOR AGRICULTURAL IMPLEMENT WITH TWO OR MORE TRAILERS
Filed June 28, 1968     6 Sheets-Sheet 5
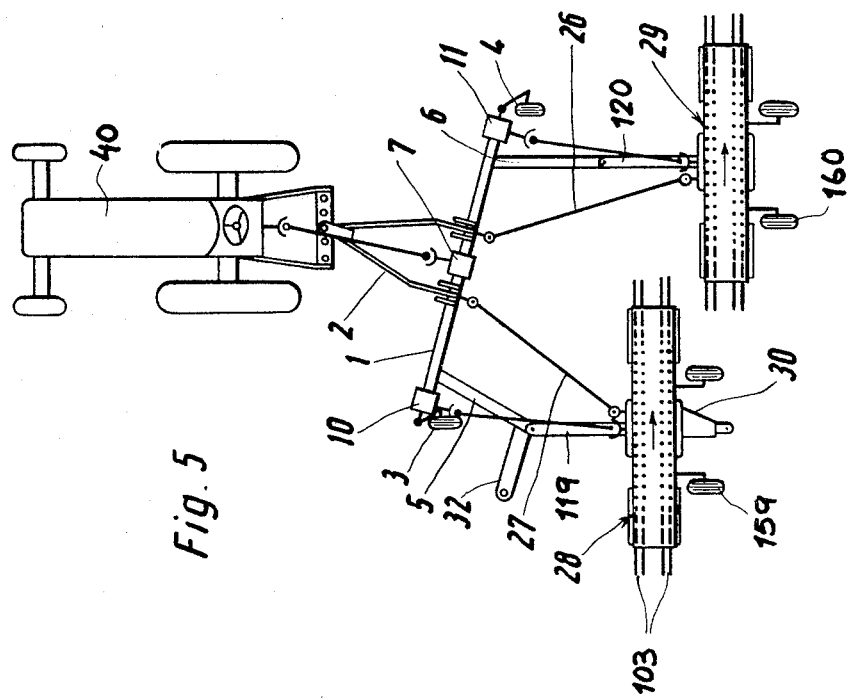
Josef Pürrer
Martin Maier
Albert Krauss
*Inventors.*
By    *Karl J. Ross*
*Attorney*

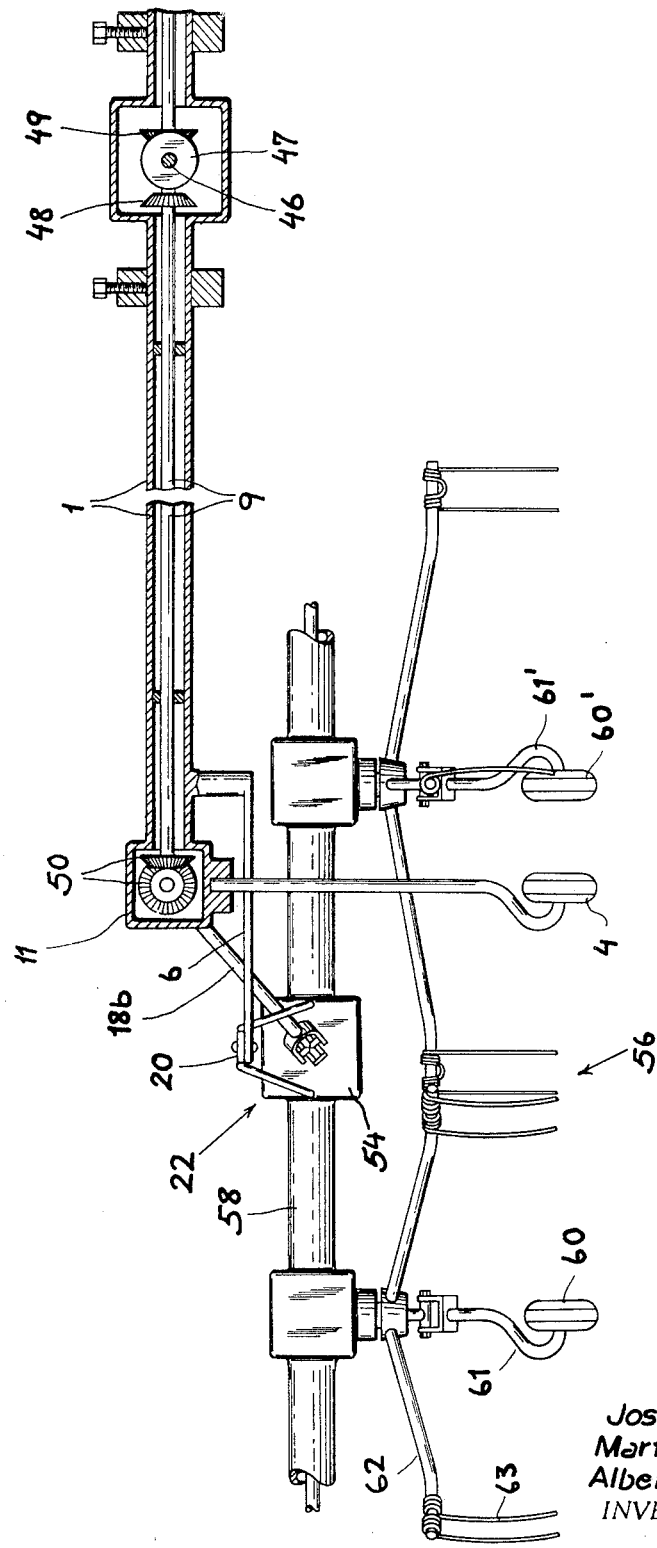

United States Patent Office 3,522,860
Patented Aug. 4, 1970

3,522,860
HITCH FOR AGRICULTURAL IMPLEMENT
WITH TWO OR MORE TRAILERS
Josef Purrer, Martin Maier, and Albert Krauss, Gottmadingen, Germany, assignors to Maschinenfabrik Fahr A.G., Gottmadingen, Kreis Konstanz, Germany, a corporation of Germany
Filed June 28, 1968, Ser. No. 740,896
Claims priority, application Germany, June 30, 1967, 1,557,783
Int. Cl. B60d 1/00
U.S. Cl. 180—14                                    10 Claims

ABSTRACT OF THE DISCLOSURE

A hitch for coupling two or more trailers equipped with rakes, tedders or the like to a common tractor in lateral juxtaposition for field work and in tandem for road transportation, with a cross-bar having two or more generally transverse mounting arms whose free ends form hinged junctions with tongues of respective trailers; one of these arms, near an end of the cross-bar, has an extension substantially parallel to that bar which can be attached to a rear rail of the tractor in lieu of a centrally mounted thill secured to this rail during field work, the detached thill being swingable about the cross-bar axis into a traveling position in which it is linked with the tongue of the trailer articulated to the last-mentioned arm.

---

Our present invention relates to a hitch for coupling a set of crop-handling attachments to an agricultural tractor, attachments for the raking, turning and tedding of ground crops such as cut grass, straw, stalks and the like.

In one type of haymaking implement to which the invention is applicable, a plurality of rake members are suspended from a substantially horizontal beam which extends generally at right angles to the direction of travel when the implement is towed by the tractor across a field to be worked. These rake members are advantageously designed as rotary cages formed from angularly spaced prongs which depend from a set of arms extending radially outwardly from a common hub. As the hub rotates about a more or less vertical axis, by means of a drive mechanism mounted within or on the supporting beam and coupled with the power-take-off shaft of the tractor, the lower tips of the prongs orbit in substantially circular planes around an axle having a supporting wheel journaled on its lower end, A tractor attachment of this type is described in commonly assigned application Ser. No. 577,335 filed Sept. 6, 1966 by Michael Stampfer.

It is generally desirable in such machines to dispose a minimum of four rotary rakes side by side in order to cut a wide swath thereby increasing the efficiency of the equipment. As the implement in this case is considerably wider than its tractor, means must be provided for reorienting the rake-supporting structure with respect to the direction of travel to facilitate transportation of the machine to and from the field. A solution heretofore proposed for this purpose (see commonly assigned application Ser. No. 647,065, filed by one of us, Joseph Pürrer, on June 19, 1967) involves the swinging of two outer beam sections, each carrying at least one rake member, with reference to a central beam section articulated thereto, the outer sections being movable between an aligned or working position and a retracted or traveling position in which these sections are substantially parallel and their rake members trail behind the rake members of the central section. According to commonly owned application Ser. No. 647,069 filed June 19, 1967 by two of us, now U.S. Pat. 3,475,890, Joseph Pürrer and Martin Maier, the axles of the wheels carried on the relatively swingable sections are interconnected by parallelogrammatic linkages insuring the maintenance of parallelism between the respective wheels.

The general object of our present invention is to provide a hitch which allows two or more trailers each carrying one or more crop-handling attachments, to be coupled to a tractor either in lateral juxtaposition, for work on the field, or in tandem, for road travel, the overall width of the equipment being thus equal to the individual width of a single trailer in travel position but corresponding to a multiple of that individual width in working position.

A more particular object of this invention is to provide simple means, easily handled by one man, for releasably locking a hitch of this type in either of its two aforementioned positions.

These objects are realized, pursuant to our present invention, by the provision of a cross-bar having two or more generally transverse mounting arms longitudinally spaced thereon and further having a thill attached to it substantially at its center, the forwardly pointing free end of the thill being engageable with a yoke or other coupling member on the rear of an associated tractor; the free ends of the mounting arms, which are pointed rearwardly in the working position of the hitch, form articulated joints with respective tongues of the several trailers to be coupled to the tractor, means being provided for bracing these tongues in the working position against the cross-bar so as to hold the tongues substantially parallel to one another in the wake of the associated mounting arms. In the travel position, the thill is decoupled from the tractor and one of the mounting arms, located near an end of the cross-bar, is connected in its stead with the tractor; upon removal of the bracing means, the cross-bar is then free to swing through about 90° into the direction of travel while the tongues move into substantial mutual alignment.

According to another feature of our invention, the thill is rotatably mounted on the cross-bar and can be swung about the axis of that bar through an angle of 180° into a position in which it is generally codirectional with the several mounting arms; in this position, the tongue articulated to the tractor-engaging mounting arm (i.e. the one that is foremost during road travel) can be releasably connected with the free end of the thill so as to steady the cross-bar in its travel position.

If the rotary rakes or other crop-handling attachments are to be driven from a power-take-off shaft of the tractor, the cross-bar may be provided with suitable transmission means including a main shaft extending longitudinally thereof and gear trains connecting this main shaft with a drive shaft in the thill and with several output studs confronting respective input studs on the associated trailers; removable connecting shafts couple the corresponding output and input studs to each other in the working position. If the axis of the main shaft coincides with the swing axis of the thill, its drive shaft may remain coupled with the main shaft (e.g. through a pair of bevel gears) during the changeover from travel to working position and vice versa.

The above and other features of our invention will become more fully apparent from the following detailed description, reference being made to the accompanying drawing in which:

FIG. 3 is a top plan view of the machine of FIG. 1 shown in travel position;

FIGS. 4 and 5 are views similar to FIG. 1, showing different working positions of a modified two-trailer combine including a hitch according to the invention; and FIG. 6 is a fragmentary cross-sectional view taken on the line VI—VI of FIG. 1.

Figure 1:
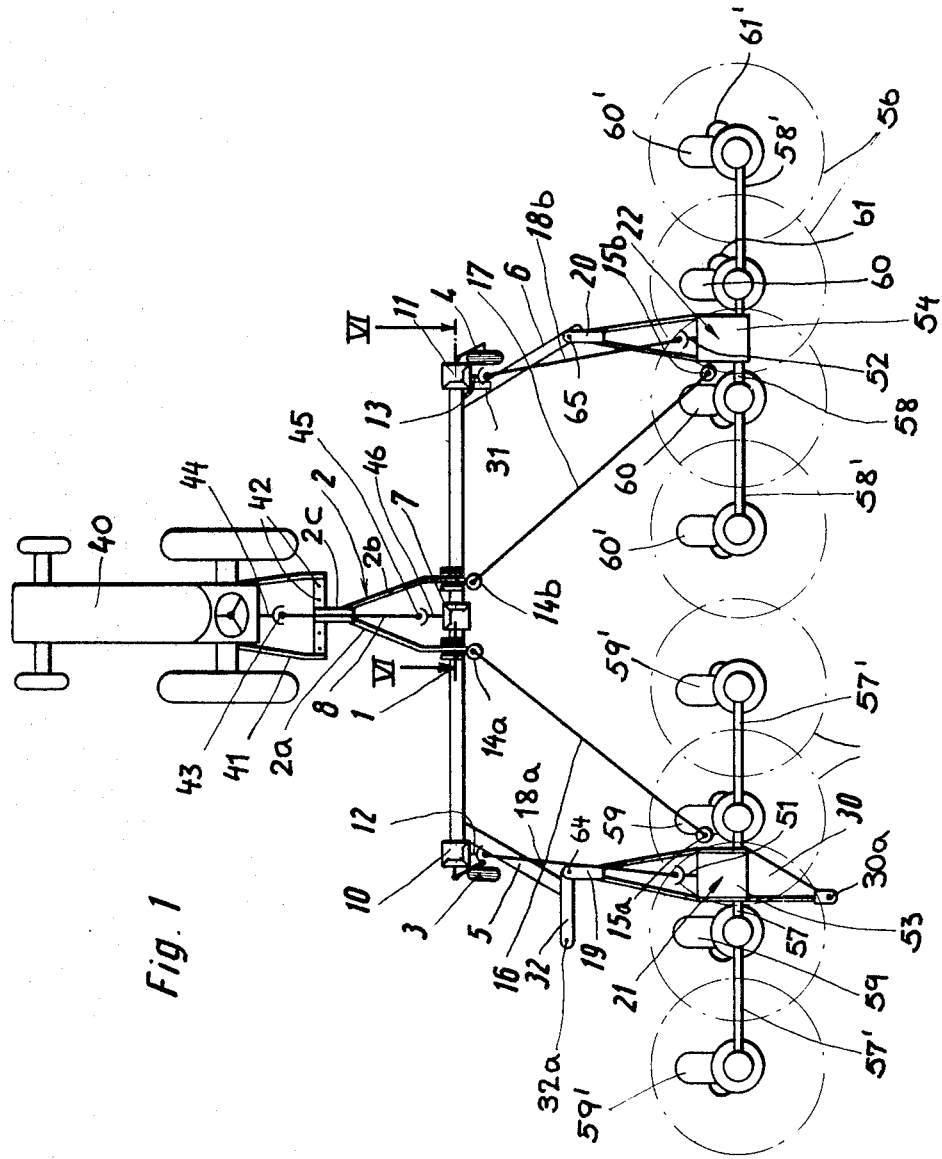
FIG. 1 is a top plan view of an agricultural machine with two trailers shown in working position and incorporating a hitch according to the invention.

The combine shown in FIGS. 1, 3 and 6 comprises a tractor 40 having a rear yoke 41 to which a thill 2 is releasably coupled, the thill including a pair of side arms 2a, 2b rigid with a lug 2c through which a pin 2d can be dropped into any one of several holes 42 in yoke 41. In the working position of FIG. 1, the front end of a drive shaft 8 operatively engages via a separable coupling 43 of the universal-type, a power-take-off shaft 44 of tractor 40. The other end of shaft 8 is detachably connected, through a similar coupling 45, with a stud shaft 46 extending rearwardly from a gear housing 7 at the center of a tubular cross-bar 1 in which a main shaft 9 (FIG. 6) is journaled. Input stud 46 is rigid with a bevel gear 47 adapted to mesh alternately with either of two bevel gears 48, 49 which are keyed to shaft 9 and are jointly slidable therealong, with the aid of a suitable handle not shown, to form with gear 47 a reversing gear train for rotating the shaft 9 in either direction. Other gear housings 10, 11 at the ends of bar 1 include further sets of bevel gears 50 (FIG. 6) for driving respective output studs 12, 13 whose torque is transmitted via detachable connecting shafts 18a, 18b to input studs 51, 52 on heads 53, 54 of a pair of trailers 21, 22, respectively. The couplings releasably connecting the shafts 18a and 18b with the associated input and output studs are similar to the universal joints 43 and 45.

Each trailer 21, 22 comprises a set of four rotary rakes 55, 56 suspended from beams 57, 58 which extend from opposite sides of the respective heads 53 and 54; these heads form housings, similar to housing 7, for gear trains which transmit the torque of stud shafts 51, 52 to shafts, not shown, within the tubular beams 57, 58 for imparting rotation to the rakes 55, 56 via further bevel-gear trains. Supporting wheels 59, 59' and 60, 60' are journaled on rods 61, 61' which are secured to the associated beam 57 or 58. The outer sections 57' and 58' of these beams may be swingable through 90° with reference to the central beam sections, as illustrated in FIG. 3 and more fully described in commonly owned application Ser. No. 729,045 filed May 14, 1968 by Josef Pürrer and Berthold Binder, for the purpose of reducing the effective width of each trailer by making the outer rakes thereof trail behind the inner rakes; the corresponding wheel-supporting rods 61' are then selectively immobilizable in two alternate positions 90° apart with reference to their beam sections 57' or 58' in order to orient the wheels 59' and 60' in planes perpendicular (FIG. 1) or parallel (FIG. 3) to these beam sections.

Each rake 55, 56 has a set of four radial arms 62 with depending prongs 63, the arms of adjacent rakes being interleaved so that their orbits may overlap as illustrated.

Cross-bar 1, whose extremities 10 and 11 are supported on orientable wheels 3 and 4, has two generally transverse mounting arms 5 and 6 which divergingly extend rearwardly (in the working position of FIG. 1) from opposite ends of the bar. The left-hand arm 5 is articulated at 64 to a tongue 19 extending forwardly from head 53 of trailer 21; this tongue has a rearward extension 30 provided with a hole 30a to receive the coupling pin 2d of thill 2 after this pin has been withdrawn from holes 42 and the thill has been swung about the axis of bar 1 into a reverse position illustrated in FIG. 3. Arm 5 has a lateral extension 32 which is parallel to cross-bar 1 and extends to the left beyond the end 10 thereof; this extension 32 has a hole 32a alignable with one of the holes 42 of yoke 41 for traversal by another coupling pin after the decoupling of thill 2 therefrom. The other mounting arm 6 forms a similar junction 65 with a tongue 20 which is rigid with head 54 of trailer 22.

In order to maintain the assembly in the position of FIG. 1 during work in the field, a pair of bracing rods 16, 17 are articulated to cross-bar 1 at 14a, 14b and have hook-shaped free ends insertable into eyes 15a and 15b on heads 53 and 54, respectively. These rods 16 and 17 thus form part of a pair of triangular linkages (including tongues 19, 20 and bar 1 with its arms 5, 6) which positively determine the orientation of heads 53 and 54 relative to cross-bar 1 in such a way that the tongues 19 and 20 are parallel to each other, beams 57 and 58 being thereby mutually aligned to maintain the trailers 21 and 22 in lateral juxtaposition whereby their rotary rakes 55 and 56 form a continuous row. When the rods 16 and 17 are disengaged from the eyes 15a and 15b, their free ends may be lodged in a cradle 31 near the end 11 of cross-bar 1, as shown in FIG. 3, whereupon the tractor 40 decoupled from thill 2 may be driven to the left side of the hitch so that mounting-arm extension 32 may be pinned to its yoke 41. When the tractor is then driven forwardly for a short distance, the trailers 21 and 22 swing (arrow A and B in FIG. 3) through 90° into a position in which their tongues 19 and 20 are aligned with each other in the direction of travel. The thill 2 may now be engaged with the tongue extension 30 of the forward trailer 21, by insertion of coupling pin 2d into hole 30a, so as to immobilize the tongue 19 and, with it, the head 53 and the beam 57 with reference to bar 1. Trailer 22 remains free to swing around its fulcrum 65 to follow the curvature of the road. Beam sections 57' and 58' are then swung back from their previous position (dot-dash lines, FIG. 3) into a trailing position (full lines) whereby the effective width of each trailer is further reduced. The supporting wheels 3 and 4 of cross-bar 1, being freely swivelable, automatically reorient themselves in the new direction of locomotion. The machine is now ready for travel along a highway.

Upon the removal of bracing rods 16 and 17 from eyes 15a and 15b, the connecting shafts 18a and 18b can be readily detached from the universal joints by which they were coupled to the output and input studs 12, 13 and 51, 52. The drive shaft 8 may also be removed from the joints 43, 45 at this stage.

Figure 2:
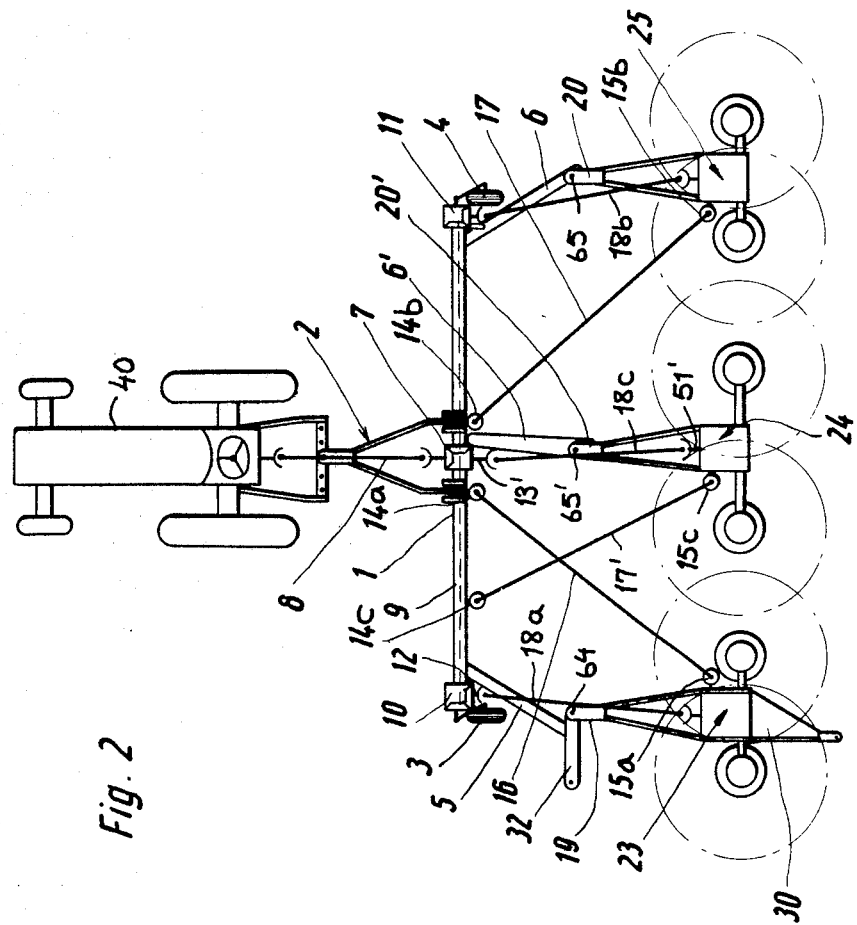
FIG. 2 is a view similar to FIG. 1, comprising a third trailer.

As shown in FIG. 2, a set of three trailers 23, 24, 25 of two rakes each may be substituted for the two four-rake trailers shown in FIGS. 1 and 3. Trailers 23 and 25 are rigid with the aforedescribed tongues 19 and 20, respectively, and are braced against cross-bar 1 by means of rods 16, 17, as in the preceding embodiment; trailer 24 has a tongue 20' articulated at 65' to an intermediate mounting arm 6' of cross-bar 1, the junction of this arm with the bar being slightly offset from central gear housing 7 so as not to interfere with the swing of thill 2. A connecting shaft 18c links an input stud 51' of trailer 24 with an output stud 13' on gear housing 7 when the tongue 20' is fixedly located with reference to cross-bar 1 by a bracing rod 17'.

In the travel position of the combine shown in FIG. 2, trailer 24 swings freely about its pivot 65' in front of the similarly swingable trailer 25. The supporting and guide wheels 59, 60 of FIGS. 1, 3 and 6, omitted in FIG. 2, may of course also be used in this embodiment.

In FIG. 4 we have shown the same type of hitch as in the embodiment of FIGS. 1 and 3 utilized for the towing of two trailers 28, 29 in the form of transverse conveyers supported on wheels 159 and 160, each conveyer comprising an endless belt with peripheral prongs 163 moving in the directions indicated by arrows C and D. Bracing rods 16 and 17 have been replaced by rods 26 and 27 of unequal length, the longer rod 26 being hooked into eyelet 115a of trailer 28 while the shorter rod 27 engages in eyelet 115b of trailer 29. By virtue of this arrangement, trailer 29 leads the trailer 28 so that its prongs sweep the stalks on the ground toward the centerline of the assembly while the prongs of trailer 28 convey these stalks further to the left, thereby depositing them in a large windrow on the side of the tractor path. In FIG. 5, the rods 26 and 27 have been interchanged so that trailer 28 is ahead of trailer 29 and the stalks are deposited in two smaller windrows at the center and on the left. Thus, by merely interchanging the two bracing rods, we are able to alter the mode of operation of the combine without reversing the direction of conveyer motion. To facilitate this reversal, the joints 14a and 15a may be simple hook-and-eye connections.

It will be noted that the bar 1 lies obliquely with reference to the path of travel in the two symmetrical working positions of FIGS. 4 and 5. This is due to the symmetrical divergence of the free ends of arms 5 and 6 and to the orientation of guide wheels 159, 160 in planes parallel to tongues 119 and 120, the longer rod 26 maintaining tongue 119 (FIG. 4) or 120 (FIG. 5) substantially aligned with one mounting arm while the other arm includes an obtuse angle with the second tongue.

When the hitch of FIGS. 4 and 5 is decoupled from the tractor 40 and reattached thereto in the manner illustrated in FIG. 3, the trailers 28 and 29 line up one behind the other to reduce the effective width of the alignment as in the case of the rotary rakes described above.

The bracing rods 16, 17 or 26, 27 may also be made adjustable in length, as by being composed of telescoped sections in a manner well known per se.

It will be understood that a hitch as disclosed hereinabove is not limited for use with the specific agricultural implements described and illustrated but can be employed with other equipment, e.g. cultivators, drill rigs or manure spreaders, without departing from the spirit and scope of our invention.

We claim:
1. A hitch for coupling a plurality of trailers to a tractor in lateral juxtaposition for field work and in tandem for road transportation, comprising:
   a thill having a free end engageable with a rear part of the tractor in a working position;
   a cross-bar provided with a plurality of generally transverse mounting arms longitudinally spaced thereon, each of said trailers being provided with a tongue articulated to a free end of a respective mounting arm of said cross-bar, one of sad mounting arms located near an end of said cross-bar being adapted for engagement with said rear part in a position with said cross-bar extending substantially in the direction of travel, said thill being mounted on said cross-bar substantially midway thereof for holding said cross-bar substantially transversely to said direction of travel in said working position with said mounting arms extending rearwardly therefrom;
   and bracing means removably engaging said tongues and said cross-bar in said working position for holding said tongues substantially parallel to one another, said tongues being free to swing into substantial alignment upon removal of said bracing means.
2. A hitch as defined in claim 1 wherein said thill includes a tractor-powered drive shaft for said trailers, said cross-bar being provided with transmission means operatively engageable with said shaft and having individual output studs for each of said trailers, the latter having input studs confronting said output studs in said operating position, further comprising connecting shafts detachably engaging said output and input studs in said working position.
3. A hitch as defined in claim 2 wherein said transmission means includes a main shaft extending along said cross-bar, central gear means for operatively coupling said main shaft with said drive shaft, and further gear means coupling said main shaft with said output studs.
4. A hitch as defined in claim 3 wherein said central gear means is a reversing gear train.
5. A hitch as defined in claim 3 wherein each of said gear means comprises a pair of bevel gears.
6. A hitch as defined in claim 1 wherein said thill is mounted on said cross-bar for rotation about the axis thereof into a reverse position generally codirectional with said mounting arms, the tongue of the trailer articulated to said one of said mounting arms having an extension adapted for engagement with the free end of said thill in the reverse position thereof.
7. A hitch as defined in claim 1 wherein said one of said mounting arms has an extension substantially parallel to said cross-bar, said extension having a termination beyond the proximal end of the cross-bar engageable with said rear part of the trailer.
8. A hitch as defined in claim 1 wherein said cross-bar is provided with at least two swivelably mounted supporting wheels.
9. A hitch as defined in claim 1 wherein said bracing means comprises a plurality of rods each defining a triangular linkage with a respective tongue and said cross-bar.
10. A hitch as defined in claim 9 wherein the free ends of said mounting arms diverge substantially symmetrically, said rods including a first rod long enough to hold the tongue of one of said trailers in substantial alignment with the associated mounting arm and a shorter second rod dimensioned to hold the tongue of another of said trailers at an obtuse angle with reference to the mounting arm associated therewith, said trailers being provided with guide wheels in planes substantially parallel to their tongues whereby said cross-bar is oriented obliquely to maintain said other of said trailers ahead of said one of said trailers in said working position, said rods being interchangeable for reversing the orientation of said cross-bar.

References Cited

UNITED STATES PATENTS

| 2,971,774 | 2/1961 | Bartel | 172—248 X |
| 2,976,058 | 3/1961 | Sandgren | 280—413 |
| 3,267,656 | 8/1966 | Lely | 56—370 |

FOREIGN PATENTS

| 691,526 | 5/1953 | Great Britain. |
| 148,178 | 12/1954 | Sweden. |
| 80,922 | 5/1963 | France. |
| | | (Addition to No. 1,276,311) |

KENNETH H. BETTS, Primary Examiner

U.S. Cl. X.R.
56—370; 280—413